Aug. 22, 1933.   J. F. ROBB   1,923,587
CONFECTION AND METHOD OF MAKING THE SAME
Filed April 27, 1931

Inventor
JOHN F. ROBB.
By Robb & Robb
Attorneys

Patented Aug. 22, 1933

1,923,587

UNITED STATES PATENT OFFICE 1,923,587

CONFECTION AND METHOD OF MAKING THE SAME

John F. Robb, Cleveland Heights, Ohio, assignor to Good Humor Corporation of America, Cleveland, Ohio Application April 27, 1931. Serial No. 533,301

15 Claims. (Cl. 99—8)

This invention appertains to the art of frozen confections of the types known as "Eskimo Pie", and "Good Humors", and particularly to the form of such confection in which the frozen body is mounted upon a stick useful for handling the body in the process of manufacture and for consuming or eating the body off of the stick or handle member.

This invention involves a method of making such frozen confections, a method of uniting the frozen confection to a stick or handle member, and the articles of manufacture that may be produced by such methods.

Certain frozen confections carried by a stick or handle member comprise the frozen body surrounded partially or wholly by a shell of edible substance such as chocolate, and a stick or handle annexed to the edible portions of the confection for the purposes above mentioned. In the carrying out of my invention I contemplate the attachment of the handle or stick to the frozen confection body by creating a bond between the shell of chocolate or equivalent substance, and the stick or handle member. The methods of making and forms of my article of manufacture will be understood upon reference to the following description in conjunction with the accompanying drawing, in which—

Figure 6:
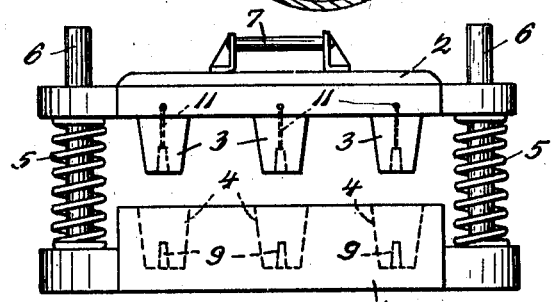
Figure 6 is a diagrammatic showing of a form of molding apparatus suitable for the purposes of this invention.

I describe the method and article of manufacture features of my invention by referring first to Figure 6 which shows a base 1 having pockets therein, each pocket to facilitate the formation of a chocolate shell or a shell of equivalent substance. The base member 1 of the mold is the female member and above the same is disposed a movable mold member 2 equipped with cores 3 adapted to fit into the pockets 4 in the mold member 1, and when so fitted, to leave a space between the parts 3 and the walls of the pockets 4, which space is the molding space for the shell of edible substance that will surround the frozen confection body. The member 2 is mounted for vertical movement, normally upraised by springs 5 on the guides 6, and is depressible by grasping the handle 7.

Figure 1:
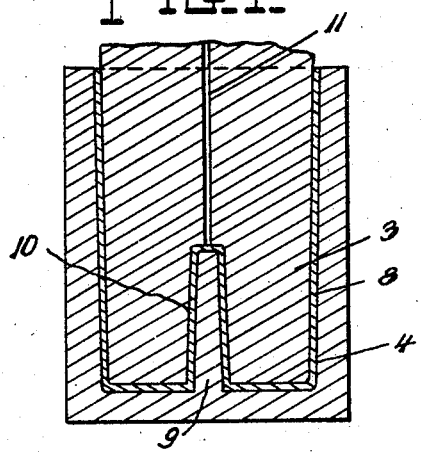
Figure 1 shows a fragmentary sectional view illustrating one of the complemental molds for forming the shell which contains the frozen body of the confection.
Figure 2:
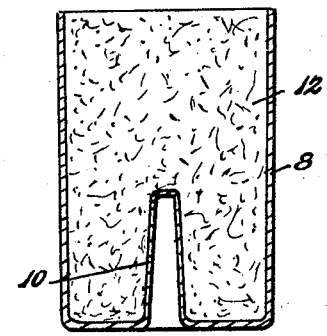
Figure 2 shows the frozen body inserted in the shell.

Figure 1 shows in fragmentary cross sectional view how the core members 3 are pushed down into the mold pockets 4, after melted chocolate or the like of a certain depth has been disposed in the said pockets 4 to form the shell 8. At the center of each pocket 4 is a vertical projection 9 designed to provide at the bottom of the shell 8 a hollow attachment stem or projection 10 formed in the molding process in an obvious manner. The core members 3 will have vent openings 11 therein because the mold is required to operate upon hot or melted substances and a gas or steam outlet is desirable to be employed for obvious reasons. The shell 8 of chocolate or similar substance being formed as in Figure 2, is filled with ice cream or sherbet or water ice, or whatever frozen or other body is desired to be used. Then, preferably, the frozen body designated 12 with the shell 8 is placed in a refrigerating apparatus so as to harden very fully, or to a desired degree, such as well known within the skill of the confectioner handling frozen confections today, if said body is of a type to be frozen.

Figure 3:
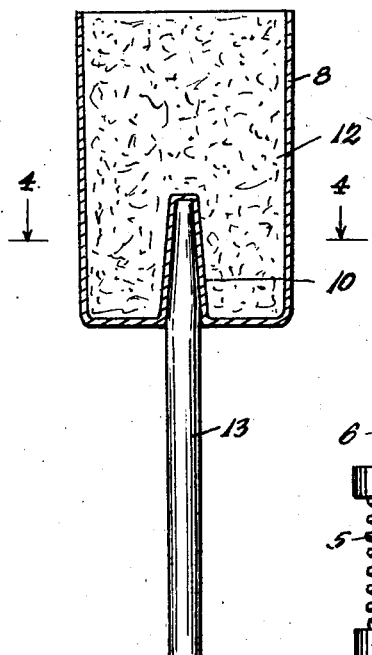
Figure 3 is a sectional view similar to Figure 2, showing the stick or handle member annexed to the shell and thereby adapted to support the frozen body.
Figure 4:
Figure 4 is a cross sectional view on the line 4—4 of Figure 3.

With the frozen body united to and relatively hard within the shell 8, the process of making my confection may continue by then applying the handle member or stick 13. This handle member or stick 13 is preferably tapered, though not necessarily so, at its upper end, and is of a size to fit snugly within the hollow stem or projection 10. When it is applied to the confection body as shown in Figure 2, the handle member is warm, having been previously heated, preferably, to such an extent that it will melt the film or portion of the chocolate stem or projection 10 with which the handle 10 engages when it is inserted into the same as shown in Figure 3. This melting of the chocolate of the stem or projection 10 will of course be momentary because the frozen body 12 surrounding the part 10 will promptly cool the chocolate or similar material of which the stem 10 is made and this cooling will create an adhesion between the hollow stem or projection 10 of the shell 8 and the handle 13 at the portions of these parts which are in contact as illustrated in Figure 3.

Figure 5:
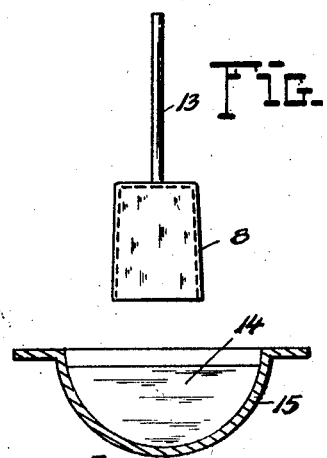
Figure 5 is a view showing the method of dipping the end of the frozen confection united with the handle member into a bath of coating substance, like chocolate, to close the end of the shell.

Now that the shell 8 is annexed or joined by effecting adhesion in the manner set forth, with the handle member 13, the whole confection may be manipulated so that if it is desired to close the upper end of the shell 8 the confection may be inverted and dipped in a vat of melted chocolate or equivalent substance, designated 14, in the vat or receptacle 15 as seen in Figure 5.

Or, if desired, this last step of Figure 5 may not be employed because the confection may be utilized and readily eaten irrespective of whether the shell 8 is closed or open.

From the foregoing it will be borne in mind that adhesion is effected between the frozen body 12 and the handle member 13 through the bonding of the handle member 13 to the chocolate shell 8. My method of manufacture is very simple and enables the frozen body 12 with its shell 8 of edible substance to be eaten very readily by the mere supporting of the edible parts from the handle member 13, much after the manner of the eating of similar frozen confections at present known in the practical art, and similar to the manner of eating candy lollipops so coated.

In the molding operation the melted chocolate or equivalent substance will be poured into the pockets 4 up to an indicator line or some other indicia means indicating the proper quantity of chocolate that is necessary to be placed in the mold or pocket in order to form a shell of the required size, when the pressure is exerted downwardly on the mold member 2 to force the melted chocolate up around the cores 3 and the projections 9.

The handle members 13 will be preferably made of wood. It is within the purview of my invention to apply the handle members 13 to the shells 8 and thereafter fill the shells with the frozen or other substance designed to be contained in the shells and to form the ultimate confection.

Having thus described my invention, what I claim as new and desire to secure by Letters Patent of the United States, is—

1. As a new article of manufacture, a frozen confection comprising a body of edible substance fluid at normal temperature, a shell in which said body is received, formed with a hollow projection extending inwardly into the said body, and a handle member received in the said hollow projection and bonded solely to the walls of said hollow projection, the said shell being relatively hard at normal temperature.

2. The method of making a frozen confection, which consists in the steps of forming a shell of edible substance hard at normal temperature, implacing within the shell a body adapted to be frozen and of such a nature that it will be fluid at normal temperature, and applying to the shell a relatively warm handle member so that the substance of the shell will initially melt and bond itself to the handle member and then harden to maintain the bond, the shell completely separating the handle member from the said body.

3. The method of making confections, which consists in forming a shell of edible material hard at normal temperature and adapted to receive an edible substance, and applying to the said shell a handle member in relatively warm condition so that it will melt the shell preliminarily and thereafter permit the shell to harden and become bonded to the handle member while completely separating the handle member from the said edible substance.

4. The method of making frozen confections, which consists in forming a shell of an edible substance hard at normal temperature and meltable when heated, implacing within the shell a frozen body fluid at normal temperature, causing a portion of the shell to become partially melted by the application of heat, and bonding to the said last portion of the shell a handle member as an incident to the melting of said portion and the subsequent hardening of the same around the handle member.

5. The method of manufacturing frozen confections, which consists in the forming of a shell having a hollow projection extending into the cavity of the shell and open so as to receive a substance adapted to be frozen, bonding a handle member to said hollow projection of the shell while avoiding introducing the handle member into the contents of the shell, and then dipping the open end of the shell, through manipulation of the handle member, into a melt which is adapted to harden and close the open end of the shell by coating the contents of the latter at said open end.

6. The method of claim 2, employing a shell of chocolate.

7. As a new article of manufacture, a frozen confection comprising an edible body, a handle member inserted in the body and of non-edible substance, and a jacket covering the portion of the handle member inserted in the body and made of a substance pleasing to the taste and with which the tongue and lips of the eater of the frozen edible body may contact after the edible body is consumed, the handle member being bonded solely to the jacket.

8. As a new article of manufacture, a frozen confection comprising an edible body, a handle member inserted in the body and of non-edible substance, and a jacket covering the portion of the handle member inserted in the body and made of a substance pleasing to the taste and with which the tongue and lips of the eater of the frozen edible body may contact after the edible body is consumed, said edible body being covered by a casing of edible substance united with the jacket aforesaid approximately at the point where the jacket enters the edible body.

9. As a new article of manufacture, a confection of the class described, including a handle member consisting of a wooden stick, a coating of edible substance pleasing to the taste surrounding the stick forming a jacket, and an edible body mounted on the stick over said jacket, the stick being bonded solely to the coating, directly.

10. As a new article of manufacture, a confection of the class described, including a handle member consisting of a wooden stick, a coating of edible substance pleasing to the taste surrounding the stick forming a jacket, and an edible body mounted on the stick over said jacket, the said edible jacket being made of chocolate, and the edible body being dipped in chocolate which unites with the jacket at one end of the body, the stick being thereby united solely with the jacket, directly.

11. As a new article of manufacture, a confection of the class described, comprising an edible body, a shell of edible material containing said body and provided with a reentrant hollow projection extending at a substantial distance into the said edible body, and a handle member united to the said body by being bonded solely to the shell aforesaid in the reentrant projection.

12. As a new article of manufacture, a frozen confection consisting of a handle member, a frozen confection body into which the handle member is inserted, the portion of the handle member inserted into the frozen confection body being covered by a jacket of chocolate directly bonded to the frozen confection body and constituting the sole connection between the body and the handle member providing edible adhesion between the body and the handle member during consumption of the body.

13. The method of manufacturing a frozen confection which includes the steps of forming a shell having an integral hollow reentrant projection, placing within the shell a confection body of a substance fluid at normal temperature and adapted to be frozen to harden the same for purposes of edibility, and applying to the hollow projection a handle member united thereto by heating the projection to cause partial melting thereof and thereafter hardening to establish a bond between the handle member and the projection.

14. As a new article of manufacture, a confection of the class described, comprising an edible body, a shell of edible material containing the body and provided with a reentrant portion projecting a substantial distance within the said edible body and being formed of an upwardly tapering configuration, and a handle member united to the said body by being bonded solely to the shell aforesaid in the reentrant projection, the said handle member being of a configuration like to that of the said projection.

15. As a new article of manufacture, a confection of the class described, comprising a shell, an edible body of frozen substance within the shell, the said shell being provided with a hollow reentrant projection extending into the said body of frozen substance, and a handle member extending into the said projection and being bonded solely to the shell along the sides of the said projection.

JOHN F. ROBB.